(12) United States Patent
Sokeila

(10) Patent No.: US 10,554,892 B2
(45) Date of Patent: Feb. 4, 2020

(54) CONFIGURING IMAGE STABILIZATION FOR STILL IMAGE GENERATION

(71) Applicant: Microsoft Technology Licensing, LLC, Redmond, WA (US)

(72) Inventor: Tomi Marko Juhani Sokeila, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 15/640,390

(22) Filed: Jun. 30, 2017

(65) Prior Publication Data

US 2019/0007618 A1    Jan. 3, 2019

(51) Int. Cl.
*H04N 5/232* (2006.01)
*H04N 5/225* (2006.01)

(52) U.S. Cl.
CPC ....... *H04N 5/23287* (2013.01); *H04N 5/2252* (2013.01)

(58) Field of Classification Search
CPC .................................................. H04N 5/23287
See application file for complete search history.

(56) References Cited

U.S. PATENT DOCUMENTS

| 8,228,400 | B2 | 7/2012 | Liu et al. |
| 9,342,871 | B2 | 5/2016 | Molgaard et al. |
| 9,560,247 | B2 | 1/2017 | Topliss et al. |
| 2009/0086036 | A1 | 4/2009 | Safaee-rad et al. |
| 2010/0265313 | A1* | 10/2010 | Liu ........................ G06T 3/4038 348/36 |
| 2013/0162850 | A1 | 6/2013 | Noguchi |
| 2015/0042827 | A1 | 2/2015 | Noguchi |
| 2016/0127646 | A1 | 5/2016 | Osborne |
| 2016/0212332 | A1* | 7/2016 | Tang .................. H04N 5/23232 |
| 2017/0013197 | A1 | 1/2017 | Border et al. |
| 2017/0019612 | A1 | 1/2017 | Kino |
| 2017/0041545 | A1 | 2/2017 | Murgia et al. |

FOREIGN PATENT DOCUMENTS

WO        2013108076 A1    7/2013

OTHER PUBLICATIONS

Goldstein, Mark, "Panasonic Lumix DMC-G7 Review", http://www.photographyblog.com/reviews/panasonic_lumix_dmc_g7_review/, Published on: Jun. 4, 2015, 12 pages.
"International Search Report and Written Opinion Issued in PCT Application No. PCT/US2018/034507", dated Aug. 20, 2018, 12 Pages.

* cited by examiner

*Primary Examiner* — Christopher K Peterson

(57) ABSTRACT

An optical image stabilization (OIS) system is configured to generate a still image from image frames captured during a video capture mode to provide efficient multiframe image enhancement. The OIS is configured in response to detection of a request to generate a still image during capture of a plurality of image frames of a scene by a device (such as during video capture). The configured OIS maintains a field-of-view of the scene over the subsequent, successive image frames, which are captured and used to generate the still image with less processing resources, less memory and/or less battery power.

20 Claims, 7 Drawing Sheets

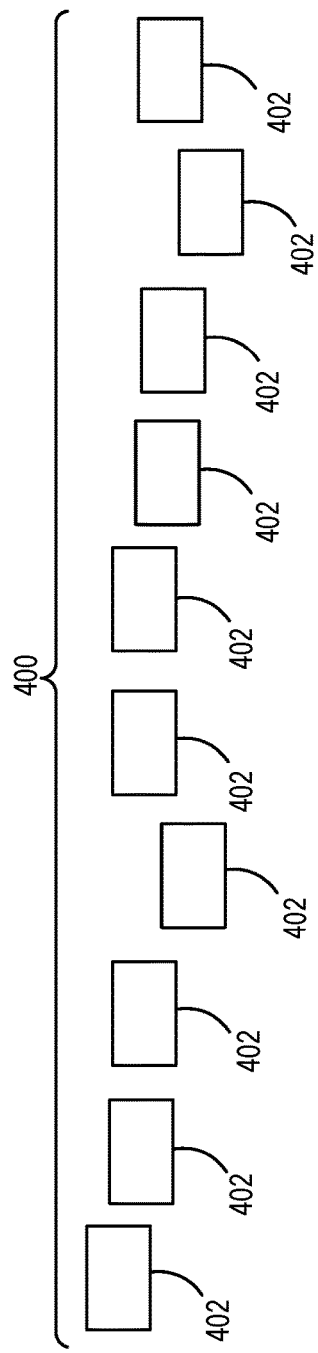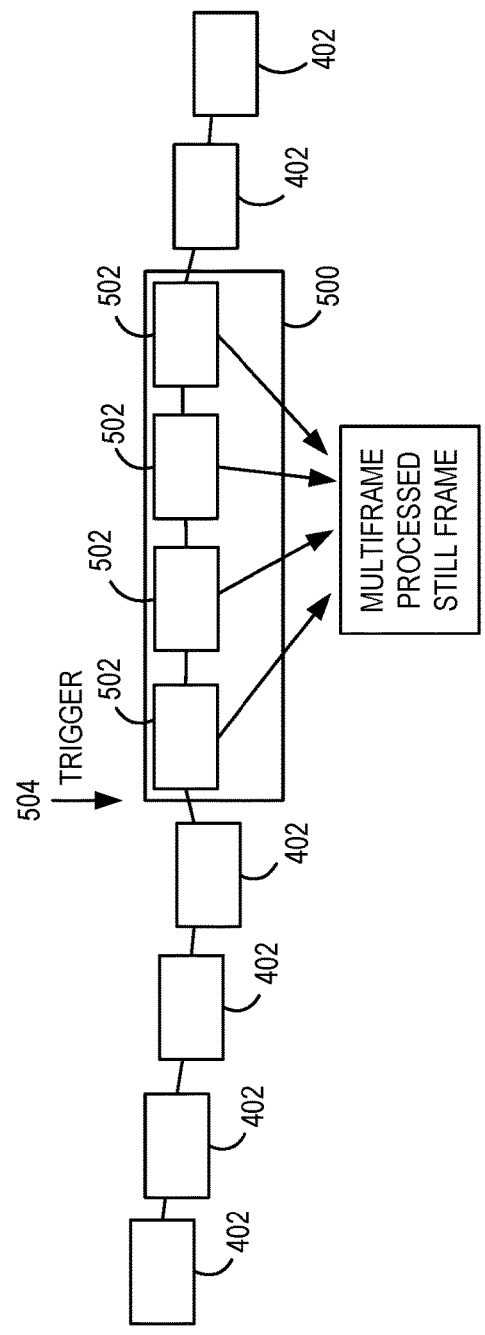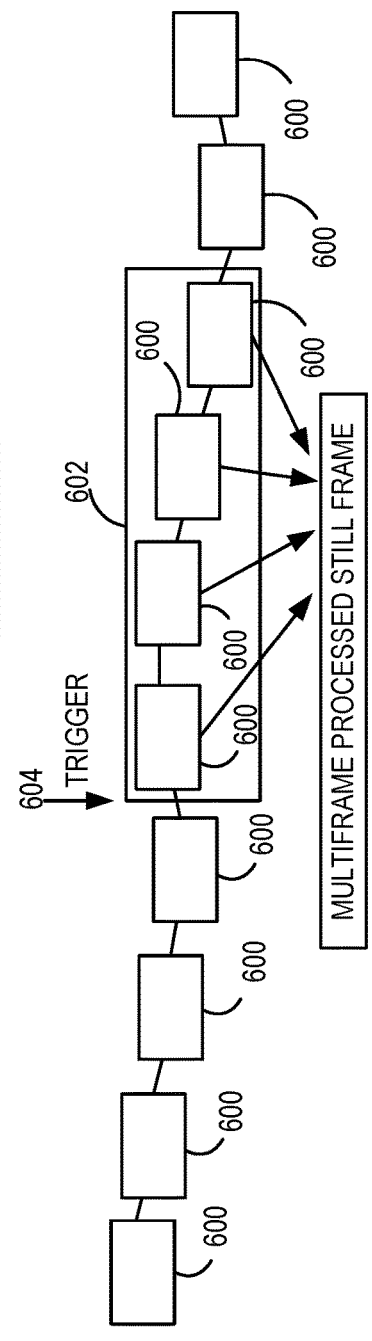

CONFIGURING IMAGE STABILIZATION FOR STILL IMAGE GENERATION

BACKGROUND

Modern computing devices, such as mobile phones, tablets, and laptops, provide capabilities to capture images. Still image capture functionality during video recording with these devices may be performed by extracting a single frame out of the video sequence. However, the exposure time for a single video frame is limited by the video frame rate, resulting in a still image having a lower image quality.

Multiple image frames from a video sequence may be used to generate a higher quality still image by combining those multiple frames, such as multi-frame noise filtering or super-resolution processing. While a higher quality still image is generated with such systems, devices that are equipped with optical image stabilization (OIS) attempt to keep the image steady over the entire sensor exposure to get less motion into the frame and to stabilize the consecutive image frames to achieve smoother end results. Because there is movement between the consecutive frames, when OIS is performed, image alignment of the captured image frames is needed before the image frames can be combined. This image alignment process results in an increased processing load, increased use of memory and/or increased battery power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for multiframe image enhancement comprises detecting a request to generate a still image during capture of a plurality of image frames of a scene by a device, configuring a pipeline to capture successive image frames from the plurality of image frames in response to the request and configuring optical image stabilization (OIS) on the device to maintain a field-of-view of the scene over the successive image frames. The computerized method further comprises capturing the successive image frames having the field-of-view of the scene maintained by the configured OIS in the pipeline and generating the still image from the captured successive image frames.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

FIG. 4 is an exemplary block diagram of image frames for multiframe image enhancement according to an embodiment;

FIG. 5 is an exemplary block diagram of image frames with a pipeline for multiframe image enhancement according to an embodiment;

FIG. 6 is an exemplary block diagram of image frames with a pipeline for still image generation according to an embodiment;

Corresponding reference characters indicate corresponding parts throughout the drawings. In the figures, the systems are illustrated as schematic drawings. The drawings may not be to scale.

DETAILED DESCRIPTION

The computing devices and methods described below are configured to efficiently generate a still image using multiframe image enhancement of a computing device having an optical image stabilization (OIS) system. When a still image request is triggered, the OIS is commanded to hold the scene steady over the exposure of all of the multiframe input images acquired from the video (or other multi-frame image capture). This OIS control results in acquired images that are mostly aligned at the capture stage, resulting in the elimination or reduction of image alignment processing to generate the enhanced still image.

Still image generation during multi-frame image capture is improved with the OIS control described herein. The captured images, being captured in an already substantially aligned relationship to each other, require little or no additional alignment prior to combining to generate an enhanced still image. As such, the processing load on the computing device may be reduced, and memory use also may be reduced relative that needed if image frame alignment were performed. Further, the battery life of the computing device is improved, as the processing to generate the still image takes less time, thus reducing battery drain on device batteries when generating the still image.

Additionally, by maintaining generally the same field-of-view during capture of successive image frames, the common area among the captured image frames is maximized, resulting in an improved still image.

This detailed description in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

Figure 1:
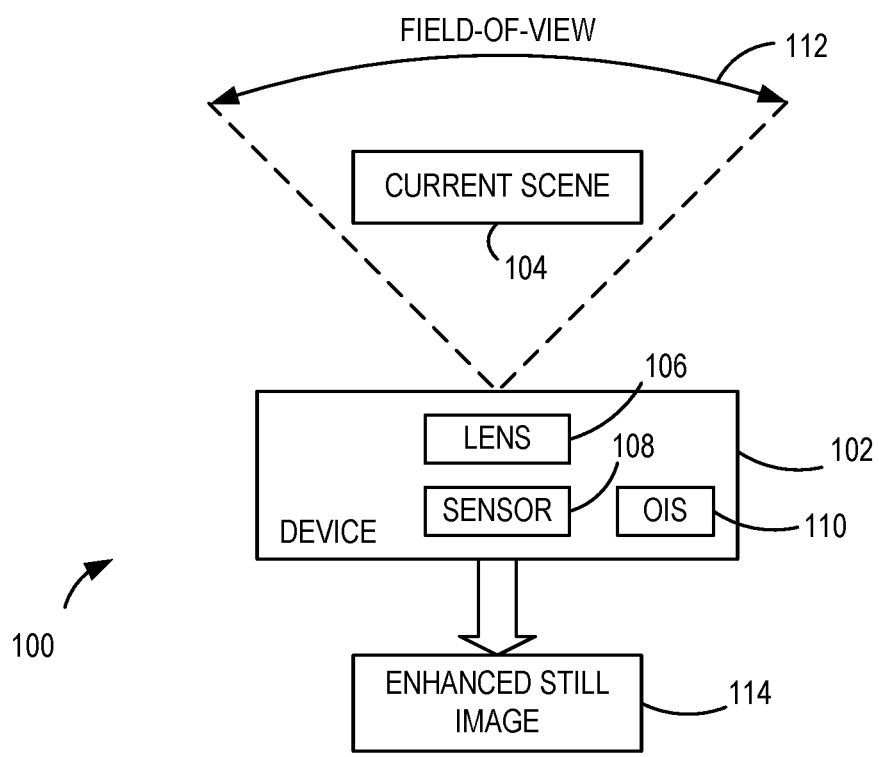
FIG. 1 is an exemplary block diagram illustrating use of a system configured for multiframe image enhancement according to an embodiment.

FIG. 1 is an exemplary block diagram illustrating use of a system 100 for generating a still image, particularly an enhanced still image according to an embodiment. A device 102 (e.g., a mobile phone, tablet, laptop, etc.) acquires a plurality of images of a scene 104 (illustrated as a current scene, such as an image including one or more objects therein) using a lens 106 and a sensor 108 (e.g., a charge-coupled device (CCD) or a complementary metal-oxide-semiconductor (CMOS) active pixel sensor) of the device 102. The device 102 further includes an OIS 110 configured to perform optical image stabilization when the device 102 is in different operating modes.

The operating modes, in one example, include a still capture mode and a video capture mode. In the still capture mode, the OIS 110 is configured to move the lens 106 and/or sensor 108 to compensate for movement of the device 102 during exposure for a still image. In this operating mode, the OIS 110 operates in an attempt to capture photons from the same location by the same pixel at the sensor 108 during the exposure despite the movement of the device 102. As such, when exposure starts, the OIS 110 locks the scene in place and attempts to keep the image framing the same despite the movement of the device 102. When the exposure is complete, the locked OIS 110 is released and the optics (including the lens 106 and the sensor 108) are no longer moved to compensate for movement of the device 102, which may include moving the optics to a predefined position (e.g., a middle viewpoint position in a field-of-view 112).

In the video capture mode, the OIS 110 is configured to keep the video smooth over the multiple image frames (without regard to movement of the device 102, and accordingly movement between successive image frames during image capture). In the video capture mode, the OIS 110 is enabled at the beginning of the video capture and the lens 106 and/or sensor 108 is moved to remove unwanted movement (e.g., shake) of the device 102 to provide a smooth look and feel over the multiple, successive image frames. The OIS 110, in this video capture mode, does not attempt to hold or maintain the scene (as in the still capture mode), as a user might want to have intentional movement in the scene. But, the OIS 110 in the video capture mode, does remove, for example, distracting shake from the video by moving the lens 106 and/or sensor 108 to accommodate for device motion.

In an example, a user desires to generate a still image, such as an enhanced still image 114, when the device 102 is operating in the video capture mode. For example, a user may desire to take a still image (e.g., generate a single still image) from video when the device 102 is acquiring image frames during a video capture operation of the video capture mode. In some examples, as described above, when the device 102 is operating in the video capture mode, while image frames are being captured over time, the OIS 110 is not locked to maintain a scene, but instead, allows relative movement between the lens 106 and sensor 108, by moving at least one of the lens 106 or sensor 108. When the request to take a still image is received or detected during the video capture mode, the OIS 110 is re-configured to hold the scene 104 steady during the period of time when the still is desired from the video recording, such that the operation of the OIS 110 is changed to compensate for movement of the device 102 when the image frames for the still image 114 are being captured, thereby maintaining the same or approximately the same field-of-view 112 while the image frames are captured. This operating behavior of the OIS 110 as described also occurs when a request is received or detected for still image generation from a high dynamic range (HDR) burst operation, or other multi-frame image fusion operation.

Thereafter, the device 102 returns to normal video capture mode operation, which is some examples, occurs automatically after a predetermined number of image frames to be combined for generation of the still image 114 have been captured (e.g., 10 successive image frames). Also, the OIS 110 is then configured to operate to remove shake during the video capture.

In an example, when the image frames are being captured for use in generating the still image 114, the OIS 110 moves the lens 106 and/or sensor 108 during video capture to maintain the same field-of-view 112 (e.g., to keep a person in the middle or other particular area of the scene 104). In some examples, the lens 106 and sensor 108 are moved relative to each other to hold the scene 104 steady when image frames are being captured for use in generating the still image 114 (locked OIS), and then the OIS 110 is unlocked after the image frames have been captured for use in generating the still image 114, such that image smoothing is again performed by the OIS 110 in the video capture mode.

Figure 2:
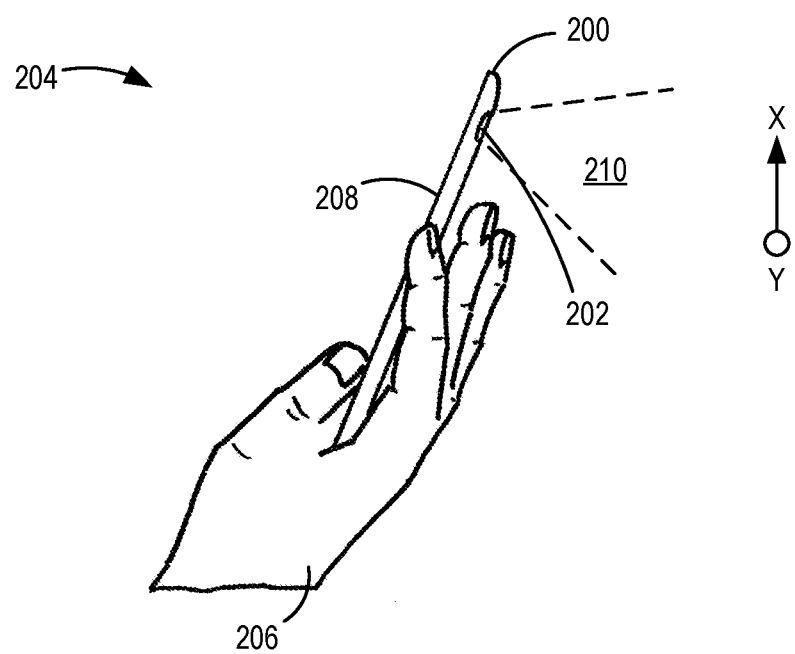
FIG. 2 illustrates an exemplary orientation for a mobile device according to an embodiment.
Figure 3:
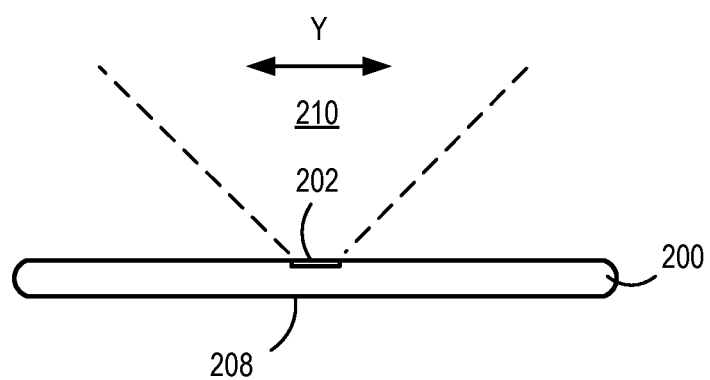
FIG. 3 illustrates an exemplary field-of-view for a mobile device according to an embodiment.

FIGS. 2 and 3 are exemplary diagrams showing a configuration for image frame acquisition for generating a still image according to an embodiment, and FIG. 4 is a block diagram showing image frames captured according to an embodiment. A mobile phone 200 is illustrated as one example of the device 102 (shown in FIG. 1). In this example, the mobile phone 200 includes a camera 202, illustrated as a rear facing camera, that allows a user to acquire images. The mobile phone 200 is operable in the still capture mode, the video capture mode, and a multi-frame burst capture mode (e.g., HDR burst operation) to acquire still images and video, respectively. In the video capture mode and multi-frame burst capture mode, the mobile phone 200 is further operable to allow for capture of multiple image frames to generate a single still image using the modified OIS operation as described herein.

As can be seen in FIG. 2, in the exemplary orientation 204 of the mobile phone 200, the mobile phone 200 may be held in a hand 206 such that an operational surface 208 faces the user and the camera 202 faces a scene to be imaged, for example, one or more objects to be videoed. Thus, the illustrated orientation 204 corresponds to a position of the mobile phone 200 that allows for the mobile phone 200 to be operated in the still capture mode, the video capture mode, and the multi-frame burst capture mode. In the orientation 204, an input can be received via the operational surface 208, such as using keys of a virtual keyboard, a track pad, and so forth. For example, the input may be a request to capture a still image during video capture by the mobile phone 200.

In the orientation 204 of the mobile phone 200, the camera 202, which may be a camera assembly that can include various components, such as a lens, a sensor, mirrors, a prism, and so forth, a field-of-view 210 of the camera 202 faces away from the operational surface 208 (e.g., away from the display), such that a user who is interacting with the mobile phone 200 can capture images (e.g., still images or video) of objects that the user is facing. In some examples, an orientation of the mobile phone 200 is determined using orientation sensors that can detect that the mobile phone 200 is tilted at an angle with reference to gravity. Using the orientation information, various operations can be performed that can cause one or more components of the camera 202 to be physically adjusted based on the angle. For example, the orientation information can be used to cause one or more components of the camera 202 to be tilted, panned, and so forth, such that the optical axis is perpendicular to a gravitational vector. Orientation information can also be used to perform various types of image processing, such as image correction to compensate for image distortion caused by an angle of the camera 202 to an object being captured.

When the video capture mode is started, such as by a user who desires to capture video, a plurality of image frames 400 are captured as shown in FIG. 4. In one example, a request to capture a still image may be detected during the video capture mode. As can be seen in FIG. 4, the individual image frames 402 during the video capture mode are not captured to maintain the same field-of-view, as illustrated by the different horizontal locations of each image frame 402 of the plurality of image frames 400. Instead of holding the scene steady in each image frame 402 relative to another image frame 402 (e.g., an adjacent image frame 402), the OIS 110 operates to adjust capture of the plurality of image frames 400 to smooth the overall captured video.

FIG. 5 is a block diagram showing a pipeline 500 according to an embodiment. The pipeline 500 is one example of an image pipeline configured to capture multiple consecutive image frames 502 in response to the required to capture the still image. For example, the user input (e.g., button press) to capture the still image during the video capture mode defines a trigger 504 at which a configured OIS of various examples described herein operates to hold a scene steady to attempt to maintain the same field-of-view in the successive image frames 502. This process to maintain the same field-of-view is illustrated by the same horizontal locations of each image frame 502 in the pipeline 500. In some examples, the number of image frames 502 to be included in the pipeline 500 is predetermined (illustrated as four image frames 502 in FIG. 5). The number of image frames 502 may be changed as desired or needed, such as based on the particular application or image being acquired, or user preference. In some examples, the still image is generated from selected ones of the image frames 502 that are not necessarily successive. This selection may be determined based on a user input, a predetermined selection, or a quality of each image frame, depending on a particular application. In one example, the captured image frames 502 in the pipeline 500 during the video capture mode using the configured OIS allows for the image frames 502 to have about the same field-of-view such that the scene being imaged is held steady, with reduced or eliminated need for subsequent image alignment when generating the still image from the captured image frames 502.

FIG. 6 is a block diagram showing image frames 600 acquired during a video capture mode with a pipeline 602 not having a configured OIS as described herein (operating in a normal video capture mode). As can be seen, even after a trigger 604, such as a request to capture a still image, the image frames 600 in the pipeline 602 continue to be smoothed by the OIS, such that the scene is not held steady, resulting in a field-of-view that is not maintained the same or otherwise differs frame to frame (illustrated by the different horizontal locations of the image frames 600).

Thus, as should be appreciated, by practicing the example shown in FIG. 5, additional processing to align the image frames 502 in the pipeline 500 for generating the still image is reduced or not needed, unlike the image frames 600 in the pipeline 602.

In some examples, a configured OIS to hold a scene steady and maintain a same field-of-view is used for a normal multiframe still capture case where the configured OIS holds steady the scene over the capture of multiple still image frames. One example of this process is in multiframe denoise. In this example, a request to capture a sequence of still images that are targeted for multiframe image fusion may be detected and the OIS is configured to maintain a current stabilized scene (holding the scene steady) over the capture of multiple image frames, such as in a pipeline. The multiple image frames may be used create an enhanced still image by combining the sequence of OIS aligned still images. The configured OIS in this example maintains the same OIS locked position over the capture of multiple still images, similar to the multiple image frames 502 (shown in FIG. 5).

Figure 7:
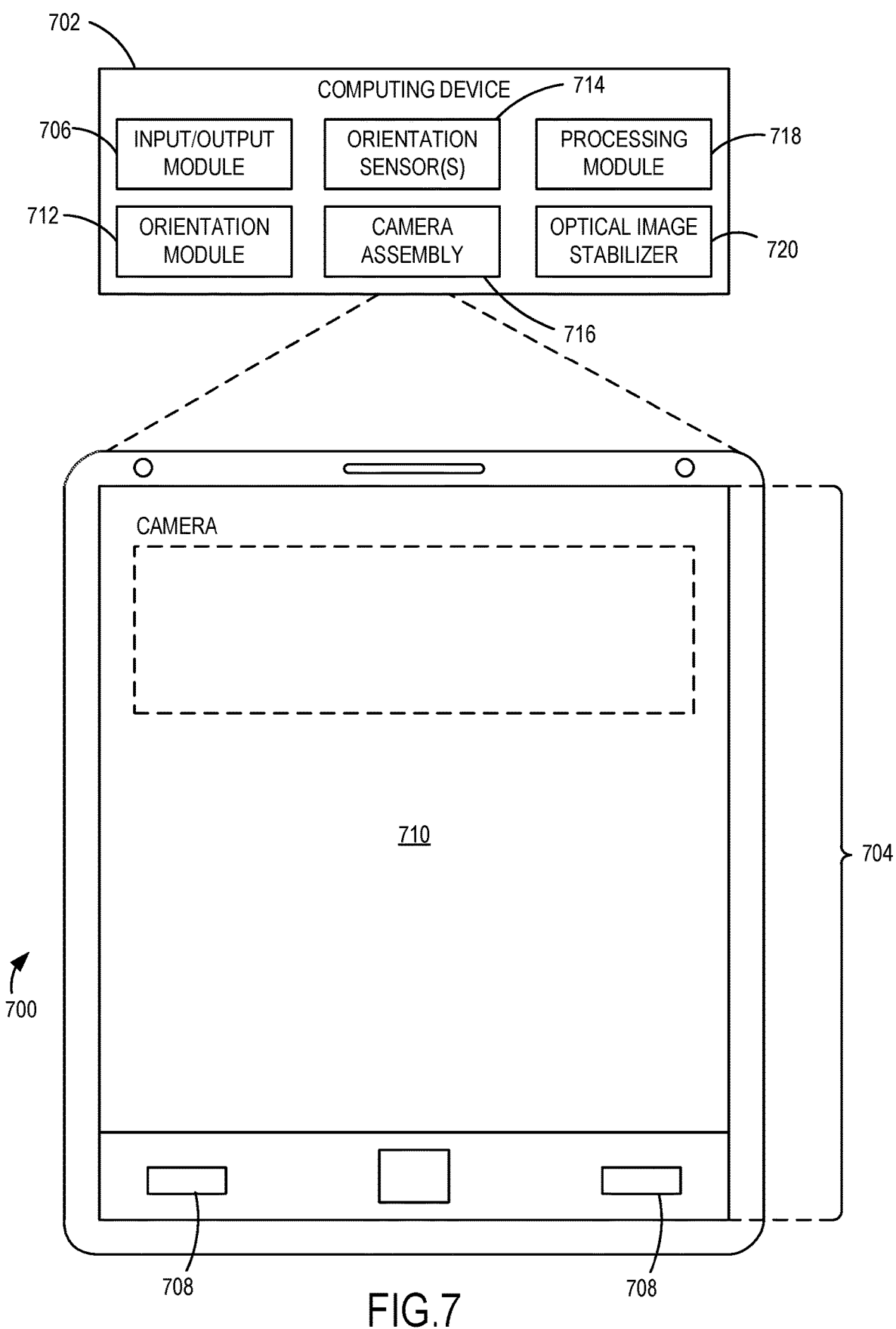
FIG. 7 is an exemplary block diagram illustrating a system including a computing device configured for multiframe image enhancement according to an embodiment.

FIG. 7 is a block diagram showing an operating configuration 700 according to an embodiment. The operating configuration 700 is operable to employ techniques described herein. The operating configuration 700 may be an example of a computing device 702 that is physically and communicatively coupled to an input device 704. The computing device 702 may be configured in a variety of ways. For example, the computing device 702 may be configured for mobile use, such as a mobile phone as illustrated, a tablet computer, and so on. Thus, the computing device 702 may range from full resource devices with substantial memory and processor resources to a low-resource device with limited memory and/or processing resources. The computing device 702 may also relate to software that causes the computing device 702 to perform one or more operations.

In one example, the computing device 702 includes an input/output module 706. The input/output module 706 is representative of functionality relating to processing of inputs and rendering outputs of the computing device 702, such as an input requesting the capture of a still image during a video capture mode. A variety of different inputs may be processed by the input/output module 706, such as inputs relating to functions that correspond to buttons 708 of the input device 704, keys of a virtual keyboard displayed by a display device 710 to identify gestures and cause operations to be performed that correspond to the gestures that may be recognized through the input device 704 and/or touchscreen functionality of the display device 710, and so forth. Thus, the input/output module 706 may support a variety of different input techniques by recognizing and leveraging a division between types of inputs including key presses, gestures, and so on.

In the illustrated example, the input device 704 is configured as having an input portion that is operable primarily using virtual inputs, although other arrangements are also contemplated. Further, other non-conventional configurations are also contemplated, such as a game controller, and so forth. Thus, the input device 704 and keys may assume a variety of different configurations to support a variety of different functionality.

The computing device 702 further includes an orientation module 712, which is representative of functionality to determine a positional orientation of the computing device 702. For example, the orientation module 712 can utilize orientation information received from one or more orientation sensors 714. The orientation sensors 714 are representative of functionality to detect types of orientation information for the computing device 702, such as angles relative to gravity, relative tilt, angle relative to earth's magnetic field, and so forth. Examples of the orientation sensors 714 include an accelerometer, magnetometer, tilt sensor, gyroscope, inclinometer, and so on. A variety of other types of orientation sensors 714 may additionally or alternatively be employed.

The orientation module 712 can utilize the orientation information to determine a relative orientation of the computing device 702. The relative orientation, for example, can indicate an angle at which the computing device 702 is tilted, such as with reference to the ground, e.g., earth's gravitational field. Orientation information can be used to perform various tasks, examples of which are discussed herein.

The computing device 702 further includes a camera assembly 716, which is representative of functionality to capture images, such as still images, video, and so on. The camera assembly 716 can include various image capture components, such as a lens, a mirror, an electronic image sensor, and so on. The camera assembly 716 can also include structural components employed to mount image capture components into the computing device 702, such as a component carrier in which the image capture components can be installed. The component carrier can enable the image capture components to be securely mounted in the computing device 702.

The computing device 702 also includes a processing module 718, which is representative of functionality to perform various operations related to image capture and generation, including as described in the various examples herein. The processing module 718 can also cause adjustments to be made to various components of the camera assembly 716. The processing module 718 can also utilize orientation information received from the orientation module 712 and/or the orientation sensors 714. The processing module 718 can use the orientation information to perform various operations, such as adjusting components of the camera assembly 716 to account for orientation of the computing device 702, image manipulation based on orientation of the computing device 702, and so forth.

The computing device 702 further includes an OIS 720, which performs optical image stabilization that is changed during various modes of operation as described herein. Additionally, the OIS 720 is operable to be dynamically changed or modified as contemplated by this disclosure such that different operating characteristics are performed upon the detection of different events or inputs. For example, as described herein, a request to capture a still image during video recording can act as a trigger to configure the OIS 720 to hold a scene steady to maintain a field-of-view across multiple image frames that are acquired in a pipeline (instead of the OIS 720 attempting to smooth the image frame capture). The acquired image frames are then used to generate a still image as described herein.

In one example, the computing device 702 is configured for multiframe image enhancement, wherein the camera assembly 716 is configured to capture a plurality of image frames of a scene during a video capture. In this example, the OIS is configured to maintain a field-of-view of the scene over successive image frames during the capture of the plurality of image frames. The processing module 718 is configured to (i) detect a request to generate a still image during the video capture and (ii) capture the successive image frames of the plurality of image frames in the pipeline, in response to the request. As described herein, the successive image frames have the field-of-view of the scene maintained by the configured OIS, and the processing module is further configured to generate the still image from the captured successive image frames more easily and efficiently. For example, by maintaining the same field-of view of the scene by holding the scene steady over all of the successive image frames, post-acquisition image alignment processing is reduced or eliminated.

In one example, the processing module 718 is configured to maintain the same field-of-view across successive image frames for the purpose of still image generation from video capture by disabling a smoothing operation of the OIS 720 when the successive image frames are captured as described herein. The processing module 718 is also configured to re-enable the smoothing operation of the OIS 720 after the successive image frames have been captured. Thus, a change to the operating characteristics of the OIS 720 may be performed based on a trigger event, such as a request to generate a still image during video capture. An operating system, camera driver, or other firmware, software, or hardware on the device may control the change to the operating characteristics of the OIS 720. In one example, the change to the operating characteristics causes the movement of at least one of the lens or the sensor of the camera assembly 716 to fix a position of the lens relative to the sensor to maintain the field-of-view of the scene during capture of the successive image frames during the video capture. The field-of-view may be maintained over successive image frames that include a plurality of consecutive image frames that are acquired continuously over time. In some examples, the OIS 720 is configured to maintain the scene as a current scene by locking the field-of-view to a viewpoint (e.g., person being videoed) during capture of the successive image frames.

In some examples, the functionality of the various components may be moved to different locations within or outside the illustrated operating configuration 700. For example, one or more operations related to generating the still image as described herein may be performed at a server location remote from the operating configuration 700. In some examples, the computing device 702 includes software and/or hardware that communicates over one or more types of network connections (e.g., Wi-Fi, cellular, etc.).

Figure 8:
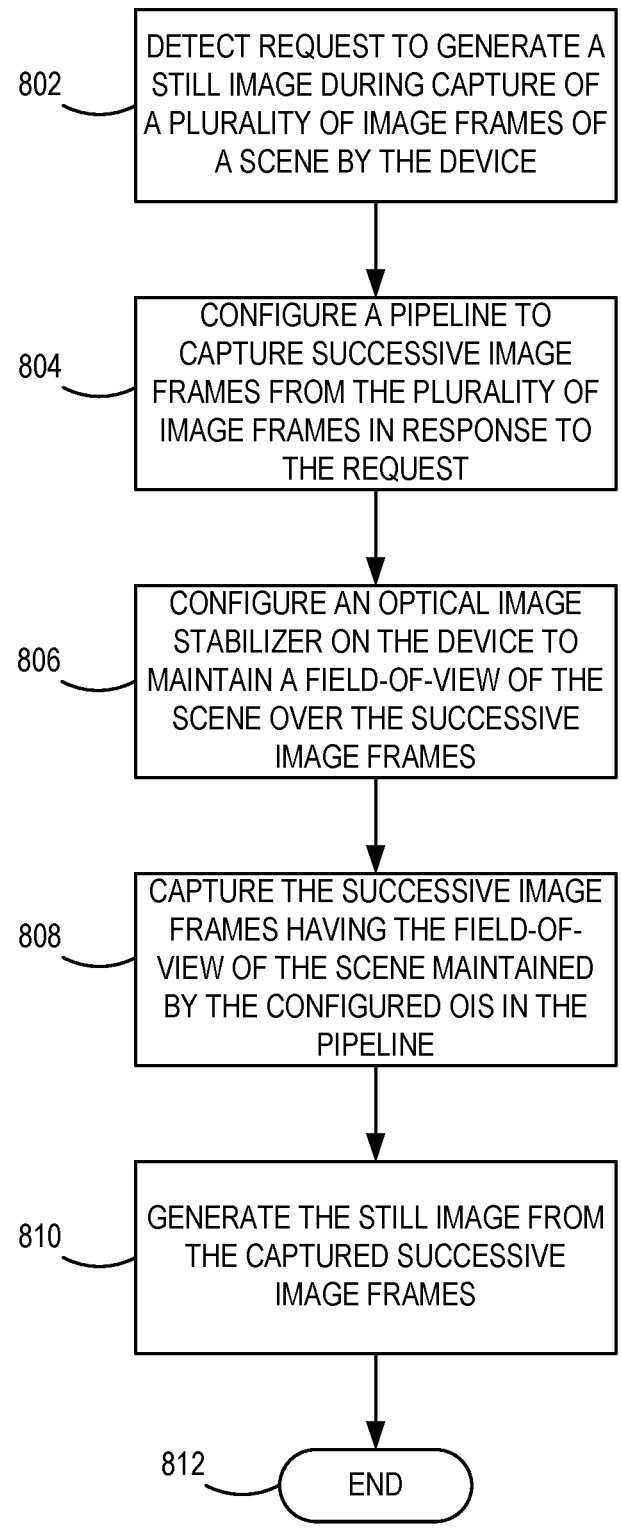
FIG. 8 is an exemplary flow chart illustrating operation of a computing device for multiframe image enhancement according to an embodiment.

FIG. 8 is an exemplary flow chart 800 illustrating operation of a computing device (e.g., device 702, etc.) to perform multiframe image enhancement. The operations illustrated in the flow chart described herein may be performed in a different order than is shown, may include additional or fewer steps and may be modified as desired or needed. Additionally, one or more operations may be performed simultaneously, concurrently or sequentially.

At 802, the device detects a request to generate a still image during capture of a plurality of image frames of a scene by a device. For example, a user may desire to generate a still image of a portion of a video recording while the video is being captured. For instance, in the video capture mode, while the device is video recording a scene, a request may be received to take an image.

At 804, the device configures a pipeline (e.g., pipeline 500) to capture successive image frames from the plurality of image frames in response to the request. For example, the pipeline may define a predetermined number of image frames to acquire for use in generating the still image. The number of image frames in the pipeline may be based on the type of video being recorded, the speed of the recording, the desired quality of the resulting still image, etc. The pipeline may be defined in a memory location in the device, such as a cache memory, that temporarily stores the captured image frames for used in generating a still image. In some examples, the capture of the plurality of image frames comprises a capture of images during a video sequence, or during multiple still image capture as part of multiframe image fusion.

At 806, the device configures an OIS (e.g., OIS 720) on the device to maintain a field-of-view of the scene over the successive image frames. As described herein, the OIS is configured to hold a scene steady such that a field-of-view across all of the image frames in the pipeline is maintained substantially or about the same. In one example, the OIS may use gyroscopic data of the device to keep the image steady (and move a lens of the device to compensate for device movement). In this example, the scene in the field-of-view is maintained within the field-of-view in successive image frames. This may include, for example, locking to a viewpoint within the scene. The configured OIS operation thereby changes during the video capture mode: from keeping movement from frame-to-frame smooth, to keeping the field-of-view steady (image scene steady). That is, in normal video capture mode operation, the OIS follows the intentional movement of the device and allows movement of viewpoint (by moving the lens) between frames. In contrast, when the OIS is configured at 806, at least one of the lens or the sensor is moved to fix a position of the lens relative to the sensor to maintain the current field-of-view of the scene during capture of successive image frames.

As such, the OIS is configured at 806 to maintain the same field-of view of the scene by holding the scene steady over all of the subsequent image frames. For example, a smoothing operation of the OIS may be disabled when the successive image frames are captured, and then re-enabled after the successive image frames have been captured.

At 808, the device captures in the pipeline the successive image frames having the field-of-view of the scene maintained by the configured OIS. In one example, the device acquires the successive image frames in cache memory that are already aligned, or mostly aligned, by the configured OIS. In this captured configuration, additional alignment of the successive image frames is reduced or eliminated because movement of the device during this portion of image frame capture was subjected to compensation by the configured OIS. For example, as described herein, the lens or sensor of the device are moved to be at a fixed position relative to each other.

At 810, the device generates the still image from the captured successive image frames. For example, using one or more different image combination techniques, the image frames are combined to generate a single still image. In some examples, the process for combining the image frames results in an enhanced still image. That is, the image properties of each of the images that would result in an improved image quality are used to generate the still image. The process ends at 812.

Figure 9:
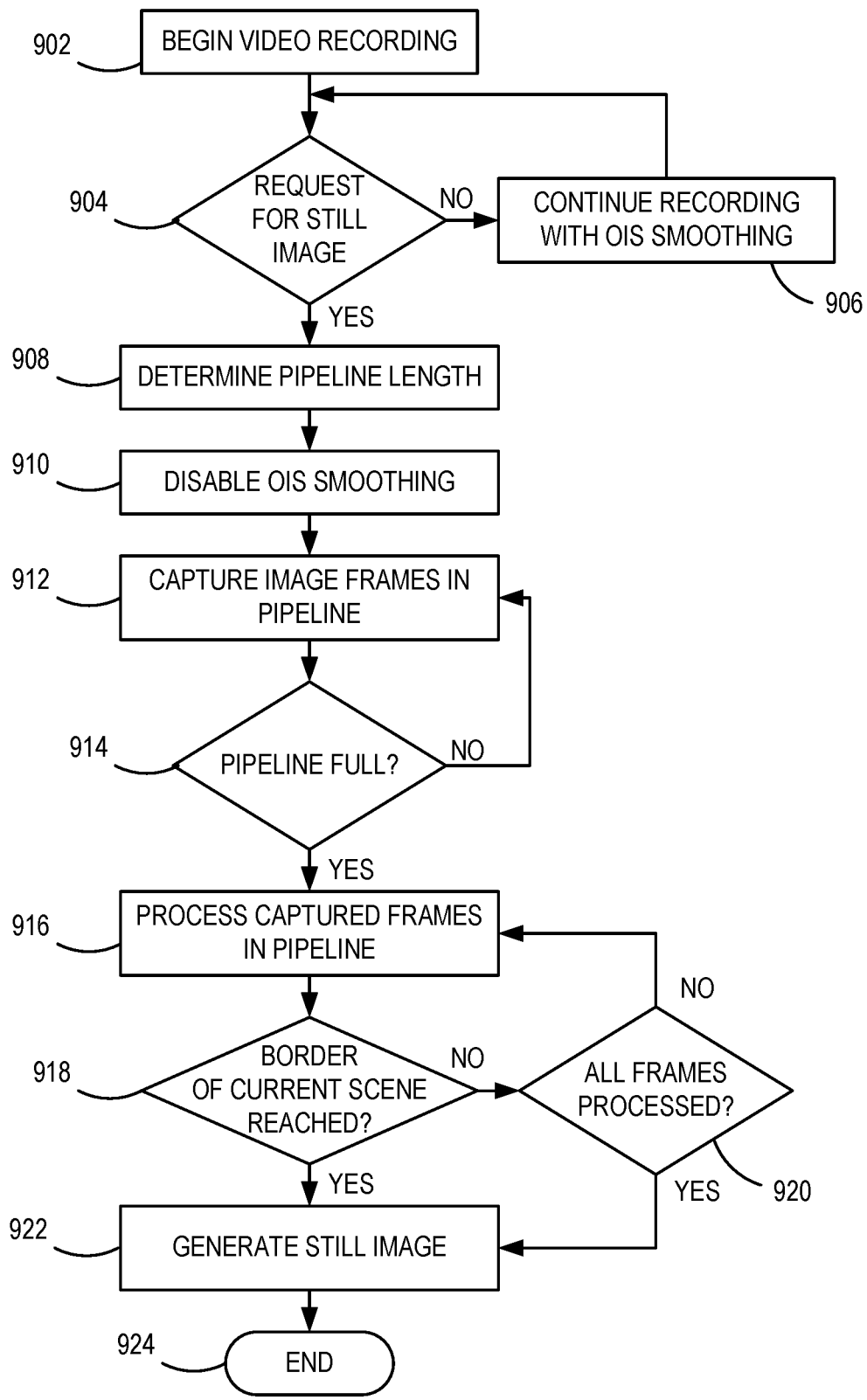
FIG. 9 is an exemplary flow chart illustrating multiframe image enhancement according to an embodiment.

FIG. 9 is an exemplary flow chart 900 illustrating operation of a computing device (e.g., device 702, etc.) to perform multiframe image enhancement. At 902 the device begins video recording. For example, a user may select a video capture mode of a mobile device (e.g., mobile phone 200), which initiates video capture of a plurality of image frames.

At 904, the device determines if a request for a still image has been made. For example, a determination is made whether a user input has been received to take a still image during the current video recording. If a request has not been received, recording of the video recording is continued with the usual OIS smoothing at 906 and as described herein. For example, OIS processing focuses on smoothing across the image frames and not maintaining a same field-of-view across the image frames.

If a request has been received at 904, the device determines a pipeline length at 908. For example, a determination is made as to a number of image frames to acquire to generate a still image. At 910, the device disables OIS smoothing. This disabling of the OIS smoothing and locking of the OIS results in the image frames to be captured in the pipeline to have the image scene held steady, such that a field-of-view of the images frames in the pipeline are all about the same. At 914, the device determines if the pipeline is full (i.e., all the desired image frames for the still image have been captured). If the pipeline is not filled, then more image frames are captured at 912. If the pipeline is filled, then the device processes the captured image frames in the pipeline at 916. For example, as described herein, the device combines the image frames to generate a single enhanced still image.

At 918, the device determines whether the border of the current scene is reached. That is, if the OIS has made adjustments to maintain the current field-of-view (e.g., to compensate for device motion), but the device has moved significantly enough such that the OIS can no longer maintain the current field-of-view, then the border has been reached. If the border is not reached, at 920 the device determines if all image frames have been processed. If all image frames have not been processed, then the captured image frames in the pipeline continue to be processed at 916. If the border of the current scene has been reached or all of the frames have been processed, at 922 the device stops capturing images for the purpose of generating the single still image, and generates the single still image. In some examples, the process for combining the image frames results in an enhanced still image. The process ends at 924.

Exemplary Operating Environment

Figure 10:
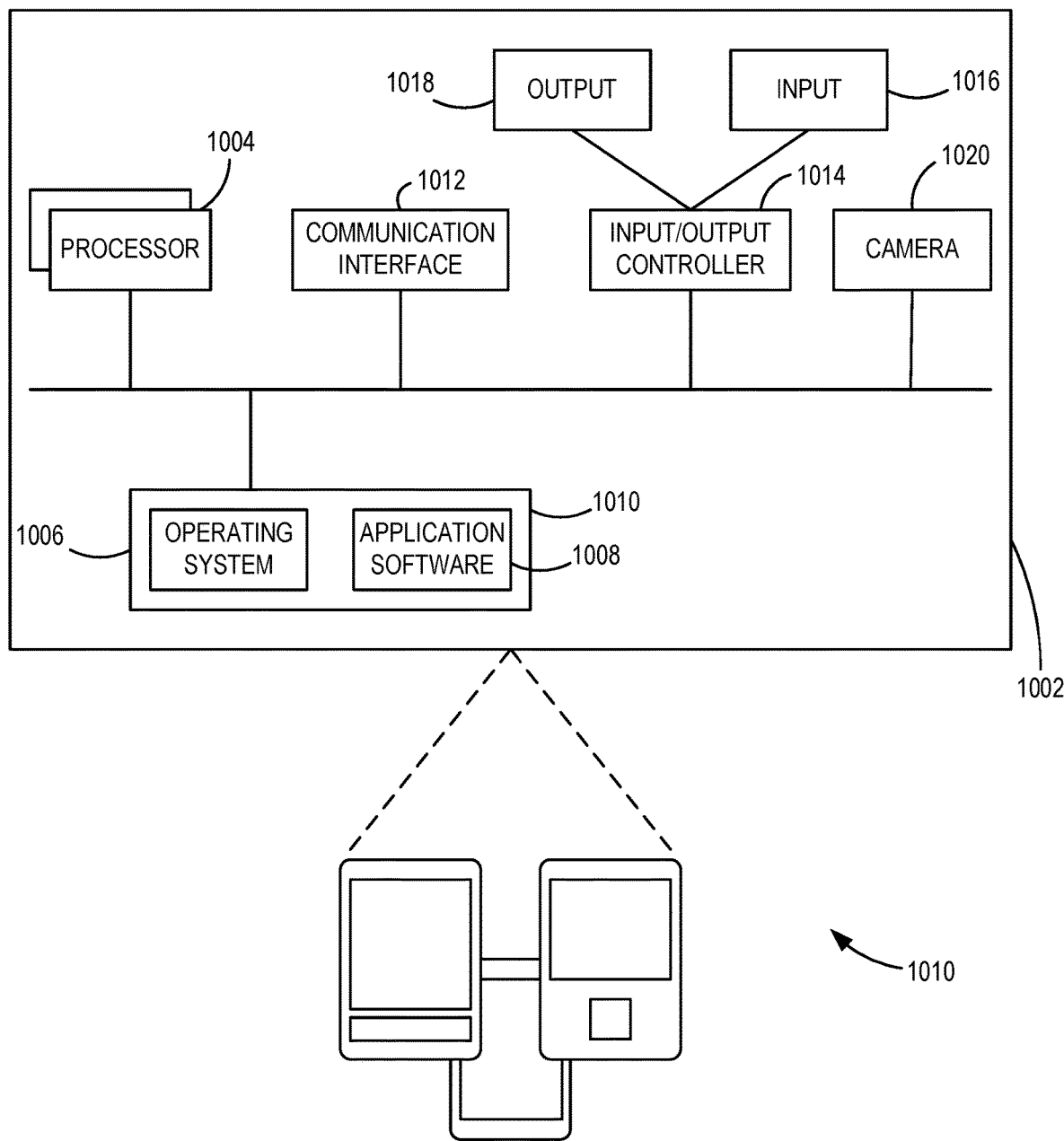
FIG. 10 illustrates a computing apparatus according to an embodiment as a functional block diagram.

The present disclosure is operable with a computing apparatus 1002 according to an embodiment as a functional block diagram 1000 in FIG. 10. In an embodiment, components of the computing apparatus 1002 may be implemented as a part of an electronic device according to one or more embodiments described in this specification. The computing apparatus 1002 comprises one or more processors 1004 which may be microprocessors, controllers or any other suitable type of processors for processing computer executable instructions to control the operation of the electronic device. Platform software comprising an operating system 1006 or any other suitable platform software may be provided on the apparatus 1002 to enable application software 1008 to be executed on the device. According to an embodiment, capture of image frames by a camera 1020 for multiframe image enhancement may be accomplished by software.

Computer executable instructions may be provided using any computer-readable media that are accessible by the computing apparatus 1002. Computer-readable media may include, for example, computer storage media such as a memory 1010 and communications media. Computer storage media, such as the memory 1010, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1010) is shown within the computing apparatus 1002, it will be appreciated by a person skilled in the art, that the storage may be distributed or located remotely and accessed via a network or other communication link (e.g. using a communication interface 1012).

The computing apparatus 1002 may comprise an input/output controller 1014 configured to output information to one or more input devices 1016 and output devices 1018, for example a display or a speaker, which may be separate from or integral to the electronic device. The input/output controller 1014 may also be configured to receive and process an input from one or more input devices 1016, for example, a keyboard, a microphone or a touchpad. In one embodiment, the output device 1018 may also act as the input device (1016). An example of such a device may be a touch sensitive display. The input/output controller 1014 may also output data to devices other than the output device (1018), e.g. a locally connected printing device. In some embodiments, a user may provide input to the input device(s) 1016 and/or receive output from the output device(s) 1018.

In some examples, the computing apparatus 1002 detects voice input, user gestures or other user actions and provides a natural user interface (NUI). This user input may be used to author electronic ink, view content, select ink controls, play videos with electronic ink overlays and for other purposes. The input/output controller 1014 outputs data to devices other than a display device in some examples, e.g. a locally connected printing device.

NUI technology enables a user to interact with the computing apparatus 1002 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electroencephalogram (EEG) and related methods).

This NUI technology may be used to obtain frames and/or generate still images by controlling the camera 1020.

The functionality described herein can be performed, at least in part, by one or more hardware logic components. According to an embodiment, the computing apparatus 1002 is configured by the program code when executed by the processor(s) 1004 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for multiframe image enhancement, the system comprising:
    a camera assembly configured to capture a plurality of image frames of a scene during a video capture;
    optical image stabilization (OIS) configured to maintain a field-of-view of the scene over successive image frames during the capture of the plurality of image frames; and
    a processing module configured to (i) detect a request to generate a still image during the video capture and (ii) capture the successive image frames of the plurality of image frames in a pipeline, in response to the request, the successive image frames having the field-of-view of the scene maintained by the configured OIS, wherein the processing module is further configured to generate the still image from the captured successive image frames.

The system described above, wherein, wherein the OIS is configured to maintain the same field-of view of the scene by holding the scene steady over all of the successive image frames.

The system described above, wherein, wherein the processing module is further configured to disable a smoothing operation of the OIS when the successive image frames are captured.

The system described above, wherein the processing module is further configured to enable the smoothing operation of the OIS after the successive image frames have been captured.

The system described above, wherein the camera assembly comprises a lens and a sensor, and the OIS is configured to move at least one of the lens or the sensor to fix a position of the lens relative to the sensor to maintain the field-of-view of the scene during capture of the successive image frames.

The system described above, wherein the OIS is configured to maintain the scene as a current scene by locking the field-of-view to a viewpoint during capture of the successive image frames.

The system described above, wherein the successive image frames comprise a plurality of consecutive image frames that are acquired continuously over time.

A computerized method for multiframe image enhancement, the computerized method comprising:
  detecting a request to generate a still image during capture of a plurality of image frames of a scene by a device;
  configuring a pipeline to capture successive image frames from the plurality of image frames in response to the request;
  configuring optical image stabilization (OIS) on the device to maintain a field-of-view of the scene over the successive image frames;
  capturing the successive image frames having the field-of-view of the scene maintained by the configured OIS in the pipeline; and
  generating the still image from the captured successive image frames.

The computerized method described above, wherein the capture of the plurality of image frames comprises a video capture.

The computerized method described above, wherein the capture of the plurality of image frames comprises a capture of multiple still images for a multiframe image fusion.

The computerized method described above, further comprising configuring the OIS to maintain the same field-of view of the scene by holding the scene steady over all of the successive image frames.

The computerized method described above, further comprising disabling a smoothing operation of the OIS when the successive image frames are captured.

The computerized method described above, further comprising enabling the smoothing operation of the OIS after the successive image frames have been captured.

The computerized method described above, wherein the device comprises a lens and a sensor, and configuring the OIS comprises moving at least one of the lens or the sensor to fix a position of the lens relative to the sensor to maintain the field-of-view of the scene during capture of the successive image frames.

The computerized method described above, further comprising configuring the OIS to maintain the scene as a current scene by locking the field-of-view to a viewpoint during capture of the successive image frames.

The computerized method described above, wherein the successive image frames comprise a plurality of consecutive image frames that are acquired continuously over time and further comprising automatically using less than a defined number of the plurality of image frames to generate the still image when the OIS reaches a border of the scene.

One or more computer storage media having computer-executable instructions for multiframe image enhancement that, upon execution by a processor, cause the processor to at least:
  detect a request to generate a still image during capture of a plurality of image frames of a scene by a device;
  configure a pipeline to capture successive image frames from the plurality of image frames in response to the request;
  configure optical image stabilization (OIS) on the device to maintain a field-of-view of the scene over the successive image frames;
  capture the successive image frames having the field-of-view of the scene maintained by the configured OIS in the pipeline; and
  generate the still image from the captured successive image frames.

The one or more computer storage described above, wherein the capture of the plurality of image frames comprises a video capture.

The one or more computer storage media described above, wherein the capture of the plurality of image frames comprises a capture of multiple still images for a multiframe image fusion.

The one or more computer storage media described above having further computer-executable instructions that, upon execution by a processor, cause the processor to at least configure the OIS to maintain the same field-of view of the scene by holding the scene steady over all of the successive image frames, including disabling a smoothing operation of the OIS when the successive image frames are captured by moving at least one of a lens or a sensor of the device to fix a position of the lens relative to the sensor to maintain the field-of-view of the scene during capture of the successive image frames, and after the successive image frames have been captured, enabling the smoothing operation of the OIS.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for multiframe image enhancement. The illustrated one or more processors 1004 together with the computer program code stored in memory 1010 constitute exemplary processing means for multiframe image enhancement.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for multiframe image enhancement, the system comprising:
   a camera assembly configured to capture a plurality of image frames of a scene during a video capture;
   optical image stabilization (OIS) configured to maintain a field-of-view of the scene over successive image frames during the capture of the plurality of image frames; and
   a processing module configured to:
      detect a request to generate a still image during the video capture, and
      in response to the detected request, instruct the OIS to hold the scene steady over an exposure of the successive image frames acquired from the video capture, the successive image frames having the field-of-view of the scene maintained by the configured OIS,
   wherein the processing module is further configured to generate the still image from the captured successive image frames.

2. The system of claim 1, wherein the OIS is configured to maintain the same field-of view of the scene by holding the scene steady over all of the successive image frames.

3. The system of claim 1, wherein the processing module is further configured to disable a smoothing operation of the OIS when the successive image frames are captured.

4. The system of claim 3, wherein the processing module is further configured to enable the smoothing operation of the OIS after the successive image frames have been captured.

5. The system of claim 1, wherein the camera assembly comprises a lens and a sensor, and the OIS is configured to move at least one of the lens or the sensor to fix a position of the lens relative to the sensor to maintain the field-of-view of the scene during the capture of the successive image frames.

6. The system of claim 1, wherein the OIS is configured to maintain the scene as a current scene by locking the field-of-view to a viewpoint during the capture of the successive image frames.

7. The system of claim 1, wherein the successive image frames comprise a plurality of consecutive image frames that are acquired continuously over time.

8. A computerized method for multiframe image enhancement, the computerized method comprising:
   detecting a request to generate a still image during capture of a plurality of image frames of a scene during a video capture by a device;
   configuring a pipeline to capture successive image frames from the plurality of image frames in response to the request by:
      configuring optical image stabilization (OIS) on the device to maintain a field-of-view of the scene over the successive image frames, and
      in response to the detected request, instruct the OIS to hold the scene steady over an exposure of the successive image frames acquired from the video capture, the successive image frames having the field-of-view of the scene maintained by the configured OIS in the pipeline; and
   generating the still image from the captured successive image frames.

9. The computerized method of claim 8, wherein the capture of the plurality of image frames comprises a video capture.

10. The computerized method of claim 8, wherein the capture of the plurality of image frames comprises a capture of multiple still images for a multiframe image fusion.

11. The computerized method of claim 8, further comprising configuring the OIS to maintain the same field-of view of the scene by holding the scene steady over all of the successive image frames.

12. The computerized method of claim 8, further comprising disabling a smoothing operation of the OIS when the successive image frames are captured.

13. The computerized method of claim 12, further comprising enabling the smoothing operation of the OIS after the successive image frames have been captured.

14. The computerized method of claim 8, wherein the device comprises a lens and a sensor, and configuring the OIS comprises moving at least one of the lens or the sensor to fix a position of the lens relative to the sensor to maintain the field-of-view of the scene during the capture of the successive image frames.

15. The computerized method of claim 8, further comprising configuring the OIS to maintain the scene as a current scene by locking the field-of-view to a viewpoint during the capture of the successive image frames.

16. The computerized method of claim 8, wherein the successive image frames comprise a plurality of consecutive image frames that are acquired continuously over time and further comprising automatically using less than a defined number of the plurality of image frames to generate the still image when the OIS reaches a border of the scene.

17. One or more computer storage media having computer-executable instructions for multiframe image enhancement that, upon execution by a processor, cause the processor to at least:
  detect a request to generate a still image during capture of a plurality of image frames of a scene during a video capture by a device;
  configure a pipeline to capture successive image frames from the plurality of image frames in response to the request by:
    configure optical image stabilization (OIS) on the device to maintain a field-of-view of the scene over the successive image frames, and
    in response to the detected request, instruct the OIS to hold the scene steady over an exposure of the successive image frames acquired from the video capture, the successive image frames having the field-of-view of the scene maintained by the configured OIS in the pipeline; and
  generate the still image from the captured successive image frames.

18. The one or more computer storage media of claim 17, wherein the capture of the plurality of image frames comprises a video capture.

19. The one or more computer storage media of claim 17, wherein the capture of the plurality of image frames comprises a capture of multiple still images for a multiframe image fusion.

20. The one or more computer storage media of claim 17 having further computer-executable instructions that, upon execution by a processor, cause the processor to at least configure the OIS to maintain the same field-of view of the scene by holding the scene steady over all of the successive image frames, including disabling a smoothing operation of the OIS when the successive image frames are captured by moving at least one of a lens or a sensor of the device to fix a position of the lens relative to the sensor to maintain the field-of-view of the scene during the capture of the successive image frames, and after the successive image frames have been captured, enabling the smoothing operation of the OIS.

* * * * *